United States Patent [19]
Wren et al.

[11] 3,811,744
[45] May 21, 1974

[54] ROLLING BEARINGS

[75] Inventors: Frederick James Wren; Eric Frank Instone; John Oliver Alford Hunt; Alan John Wright, all of Northampton, England

[73] Assignee: The Timken Company, Canton, Ohio

[22] Filed: Jan. 19, 1973

[21] Appl. No.: 325,161

[30] Foreign Application Priority Data
Jan. 20, 1972 Great Britain.................... 2871/72

[52] U.S. Cl. ............................................ 308/235
[51] Int. Cl. .......................................... F16c 33/38
[58] Field of Search................. 308/235, 204, 237

[56] References Cited
FOREIGN PATENTS OR APPLICATIONS
1,327,643  4/1963  France............................. 308/217

*Primary Examiner*—Manuel A. Antonakas
*Assistant Examiner*—Frank Susko
*Attorney, Agent, or Firm*—Gravely, Lieder & Woodruff

[57] ABSTRACT

A flat tapered roller thrust bearing has a cage provided with axially directed lips which engage the opposed faces of the races and seal the bearing. The cage may also be provided with axially extending flanges which are shaped to enclose the outer diameter of the races so as to hold the races together.

10 Claims, 8 Drawing Figures

3,811,744

ROLLING BEARINGS

BACKGROUND OF THE INVENTION

This invention relates to rolling bearings, and particularly flat thrust tapered roller bearings.

Thrust bearings, such as that shown in section in FIG. 1 are known which consist of two opposing thrust races 1, having either frusto-conical or flat track surfaces 2, between which are mounted respectively tapered or cylindrical rolling elements, 3. Such bearings may be filled with rollers, and thus be cageless, or may be fitted with a cage 4, having pockets each for receiving and locating a rolling element. The bearings may have a pressed metal outer retaining member 5, which encloses the bearing and creates a self contained bearing assembly. In the assembled condition a shaft passes through the bore of the bearing. The shaft, and the retaining member 5 resist the escape of lubricant from the bearing and the entry of foreign matter into the bearing. The retaining member 5, thus holds the bearing together and acts simultaneously as an outer sealing member. Sealing of the bearing at the bore position is achieved by assembling the bearing on a co-operating shaft.

Such an assembly is commonly used in the thrust position of steering pivots of heavy vehicles, but it may also be used in crane hooks or any other application requiring a bearing of the thrust type and where slow rotation or oscillation is involved. Whilst the bearing shown in FIG. 1 is satisfactory for most duties, it has been found that in some cases moisture has penetrated into the bearing, by way of the small gap which exists between the mounted bearing bore and the shaft, and corrosion of the bearing working surfaces has resulted.

SUMMARY OF THE INVENTION

It is an object of the present invention to provide an improved arrangement for sealing a thrust bearing.

According to the present invention a combined cage and seal for a flat thrust rolling bearing comprises an annular disc-like member made of a plastic material and having a plurality of pockets each for receiving and locating a rolling element, the member being provided on each face with an annular lip which is positioned radially inwardly of the pockets and extends axially from the member, the ends of the lips being positioned so as, in use, to be engaged by and compressed between the opposed faces of the bearing races.

The improved cage and seal may be provided on each face with an additional annular lip which is positioned radially outwardly of the pockets, the two lips on each face defining with the engaged faces of the races a sealed enclosure for the rolling elements.

The improved cage and seal may also be formed on each face with an outer peripheral flange which is dimensioned to receive and embrace the periphery of a bearing race whereby the combined cage and seal also acts as a retainer for the bearing assembly.

DESCRIPTION OF THE DRAWINGS

Some embodiments of the combined cage and seal of this invention are described with reference to the accompanying drawings, in which.

DETAILED DESCRIPTION

Figure 1:
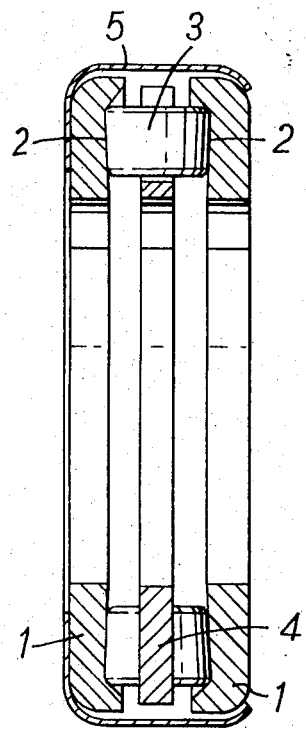
FIG. 1 is a sectional view of a conventional tapered roller thrust bearing.
Figure 2:
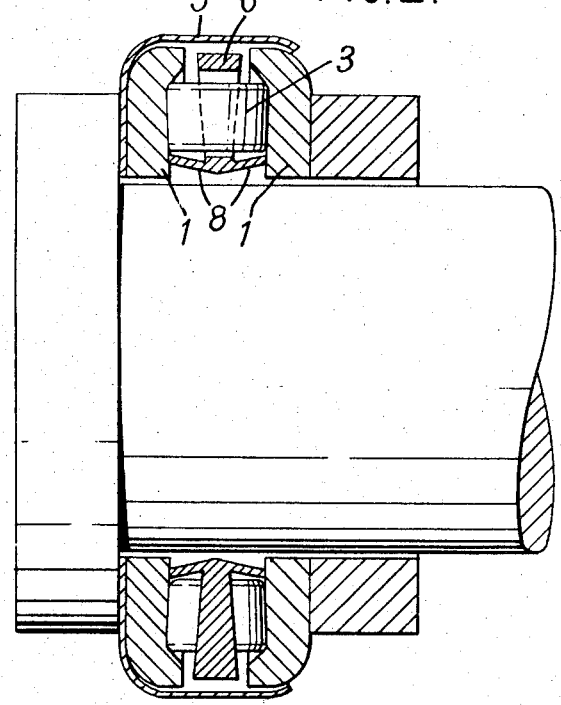
FIG. 2 is an axial section of a bearing incorporating one embodiment of the combined cage and seal of this invention.
Figure 3:
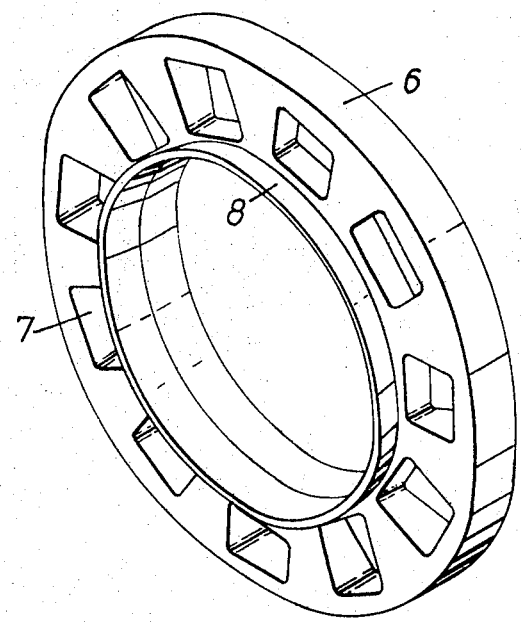
FIG. 3 is a perspective view, partly cut away, of the combined cage and seal of the bearing of FIG. 2.

Referring to FIGS. 2 and 3 there is shown a bearing having an outer metal retaining member 5, which functions as described previously with reference to FIG. 1. The cage 6, however, is moulded from a plastics material to provide pockets 7 for rolling elements 3 and two annular axially extending lips 8 positioned radially inwardly of the pockets, and which, on assembly, are compressed between the inner faces of the race members 1. Actually the pockets 7 are in a disk-like body from which the lips 8 project. Preferably the lips 8 extend in a direction which is inclined to the central longitudinal axis of the cage 6 so that they readily collapse elastically, when the race members 2 are brought together, and create a uniform sealing pressure between their ends and the opposed faces of the race members 1. During service, wear will take place and allow the lips 8 to move towards their original position. The lips 8, together with the retaining member 5, thus effectively seal the bearing during its lifetime, preventing the escape of grease from the bearing and entry of foreign matter into the bearing. The cage 6 and the sealing lips 8 are integral and are moulded from a common plastics material.

Figure 4:
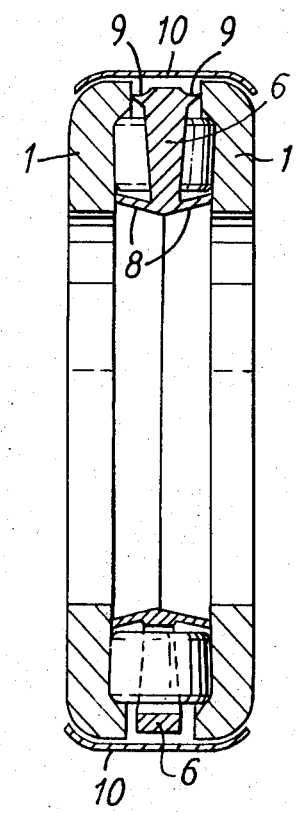
FIG. 4 is an axial section of a bearing incorporating a second embodiment of the combined cage and seal of this invention.

The upper half of FIG. 4 shows an alternative combined cage and seal having a first pair of axially extending lips 8 arranged radially inwardly of the pockets for the rolling elements 3 and a second pair of axially extending lips 9 arranged radially outwardly of the pockets. The lips 8 and 9 are compressed between race members 1 on assembly and thus totally seal the bearing. They are moulded integrally with the cage 6 and must be of such a shape and flexibility as to allow a suitable and even sealing pressure to exist between their ends and the race members 1. The retaining and shielding member 10 is a known means of unitizing such a bearing, the member 10 being manufactured from a metal or plastic material. The lower half of FIG. 4 shows the cage 6 and seal of FIGS. 2 and 3 in use with the retaining member 10.

Figure 5:
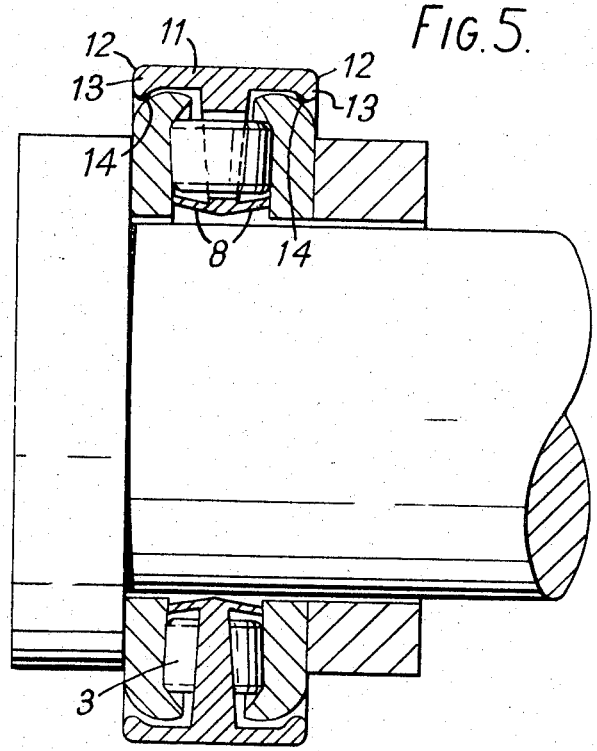
FIG. 5 is an axial section of a bearing incorporating a third embodiment of the combined cage and seal of this invention.

FIG. 5 shows a bearing having a further modified type of cage and seal. In this case, the cage 11 again has axially extending sealing lips 8, arranged radially inwardly of the pockets 7. The cage 11 also has axially extending flanges 12, at the outer diameter position, these flanges being shaped to enclose the outer diameter of the bearing races 1 and thus retain them. Contact between faces 13 of the flanges 12 of the cage 11 and faces 14 of the races form sealing contacts which prevent the ingress of foreign material and the escape of lubricant. The sealing, retaining and cage members are integral and moulded from a common plastics material.

Figure 6:
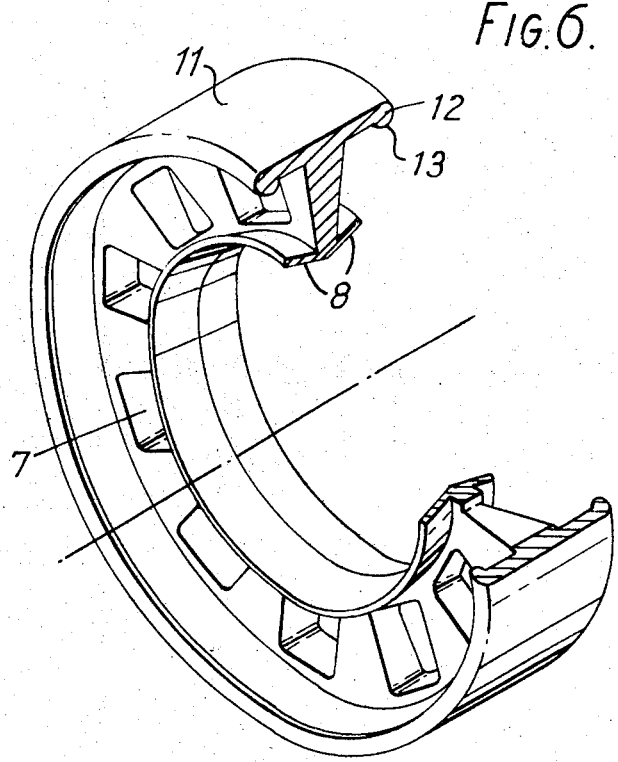
FIG. 6 is a perspective view, partly cut away, of the combined cage and seal shown in FIG. 5.
Figure 7:
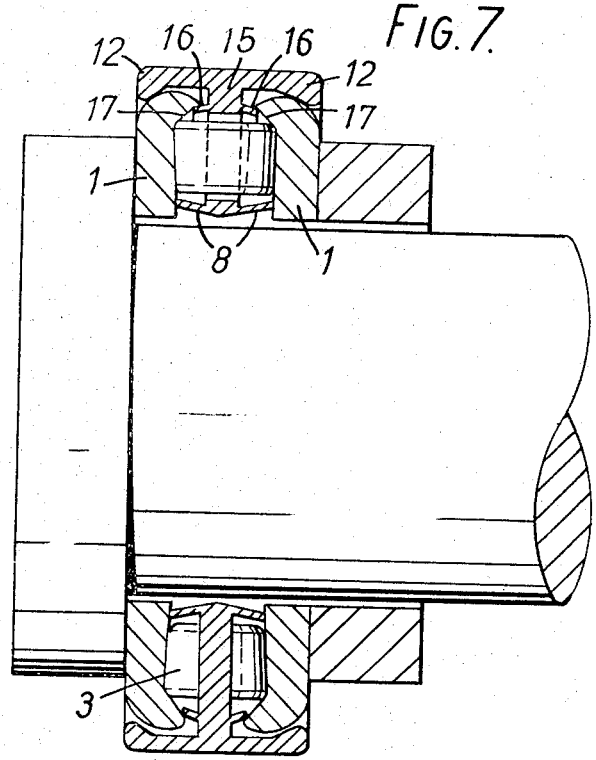
FIG. 7 is an axial section of a bearing incorporating a fourth embodiment of the combined cage and seal of this invention.
Figure 8:
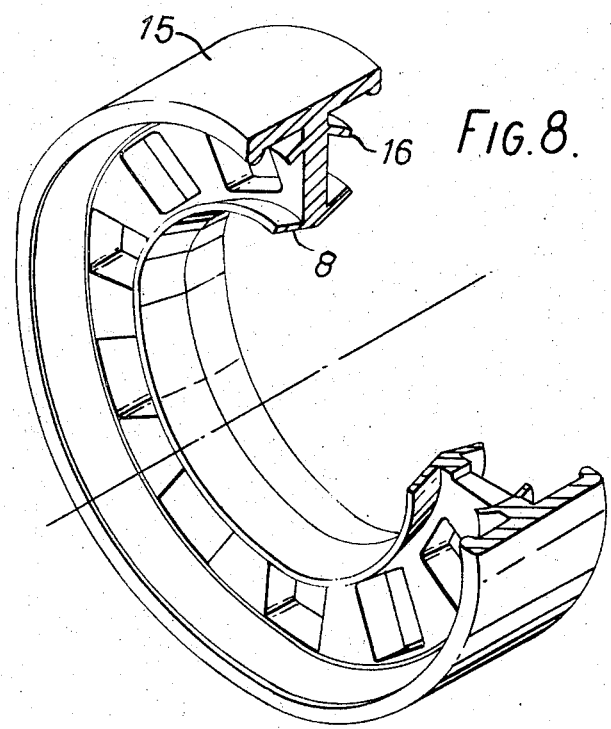
FIG. 8 is a perspective view, partly cut away, of the combined cage and seal of the bearing shown in FIG. 7.

FIGS. 7 and 8 illustrate a further arrangement. As compared with the embodiment of FIGS. 5 and 6, the combined cage, sealing and retaining member 15, has additional axially extending lips 16 which are compressed between chamfered portions 17, of the race members 1, on assembly. The bearing is thus fully sealed and shielded by the lips 7 and 16 and retained by the flanges 12. The member 15 is produced from a plastic material, the sealing lips 8 and 16 and flanges 12 being integral with the cage.

Bearings of the types shown in FIGS. 2, 4, 5 and 7 have certain advantages over a bearing of existing design. The cage/sealing element or the cage/sealing-/retaining element may be formed accurately and cheaply by a moulding process using a relatively cheap plastic material. The assembled bearing is totally sealed and loss of grease or ingress of foreign matter into the bearing is prevented during storage, handling and subsequent assembly and use. It gives improved sealing in use and may replace existing bearings without modification to either shaft or housing.

An additional advantage with the types of combined cage/sealing/retaining element shown in FIGS. 5 and 7, is that the forces involved in pressing the races into the retainer are minimal. Thus bearing track damage, which can result from accidental overload during the pressing operation which is required to carry out the final forming operation on a metal retainer, is prevented.

What is claimed is:

1. In a thrust bearing having annular races provided with opposed track surfaces and rolling elements between the races and engaged with the track surfaces so that the track surfaces are spaced apart in the axial direction and one race will rotate relative to the other race, an improved cage comprising: a disk-like body located between the track surfaces and having circumferentially spaced pockets in which the rolling elements are contained; annular sealing lips on the body and extended therefrom in both axial directions, the lips being flexible and being engaged with the races to form seals with the races; and flanges projected axially from the disk-like body and interlocking with the races such that the races can rotate relative to each other and to the cage, but are maintained together so they cannot be withdrawn in the axial direction, whereby the cage maintains the proper spacing between the rolling elements, seals the interior of the bearing, and unitizes the bearing.

2. The structure according to claim 1 wherein the lips are located radially inwardly from the roller pockets.

3. The structure according to claim 2 wherein the flanges are located radially outwardly from the pockets and engage the races to form seals therewith.

4. The structure according to claim 2 wherein another set of annular sealing lips is on the body outwardly from the pockets therein, the other sealing lips also projecting axially, being flexible, and engaging the races to form seals therewith.

5. The structure according to claim 4 wherein the cage is an integral unit formed from plastic.

6. The structure according to claim 1 wherein the flanges overlie the peripheral surfaces of the races.

7. The structure according to claim 6 wherein the flanges are directed radially inwardly at their ends and engage the races to prevent the races from being withdrawn from each other.

8. The structure according to claim 1 wherein the lips are inclined at oblique angles relative to the axis of rotation for the bearing.

9. A thrust bearing comprising a pair of annular races having center bores and opposed track surfaces, rolling elements between the races and engaged with the track surfaces to space the track surfaces apart and to enable one race to rotate relative to the other race; an annular disk-like body between the track surfaces of the opposed races and having circumferentially spaced pockets in which the rolling elements are contained so that the disk-like body maintains the proper spacing between the rolling elements; retaining members carried by the disk-like body and extending axially therefrom over the peripheries of the two races, the retaining members being directed inwardly beyond the races to a diameter less than the outer diameter of the races so that the retaining elements prevent the races from being separated; and seal means carried by the disk-like body and engaged with the two races for preventing the ingress of contaminants into the interior of the bearing.

10. A thrust bearing according to claim 9 wherein the seal means is located inwardly from the pockets in the body.

* * * * *